Figure 1:
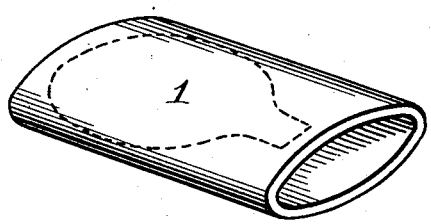

No. 762,063. PATENTED JUNE 7, 1904.
I. F. KEPLER.
PROCESS OF MAKING HOLLOW RUBBER ARTICLES.
APPLICATION FILED MAR. 19, 1903.
NO MODEL.

WITNESSES:
Alvin K. Goodwin
Oliver Williams

INVENTOR
Irwin Floyd Kepler
BY Edward Davis
ATTORNEY

THE NORRIS PETERS CO., PHOTO-LITHO., WASHINGTON, D. C.

No. 762,063.

Patented June 7, 1904.

UNITED STATES PATENT OFFICE.

IRWIN FLOYD KEPLER, OF AKRON, OHIO, ASSIGNOR TO THE B. F. GOODRICH COMPANY, OF OHIO, OF AKRON, OHIO, A CORPORATION OF OHIO.

PROCESS OF MAKING HOLLOW RUBBER ARTICLES.

SPECIFICATION forming part of Letters Patent No. 762,063, dated June 7, 1904.

Application filed March 19, 1903. Serial No. 148,621. (No specimens.)

*To all whom it may concern:*

Be it known that I, IRWIN FLOYD KEPLER, a citizen of the United States of America, residing at the city of Akron, county of Summit, and State of Ohio, have invented a new and Improved Process of Making Hollow Rubber Articles, of which the following is a specification.

This invention relates to an improved process of making hollow rubber balls, bulbs, or other articles, and has for one object to produce a ball, bulb, or other hollow rubber article having a substantially uniform molecular character throughout its structure.

A further object of the invention is to permit the use of less expensive stock in making hollow rubber articles of equal or greater strength than those heretofore produced from higher-grade stock.

A final object of the invention is to provide for making these hollow rubber articles practically without handwork and by simple machinery easily operated by labor of a less skilled grade and correspondingly much less expensive than that required to run ordinary sheet-rubber calendering-machines, the use of which is dispensed with in the practice of my invention.

I attain these objects, primarily, by the use of tubing formed from uncured rubber stock properly macerated to uniform consistency and, secondarily, by the use of suitable cutting and pressing dies to cut and press a double-walled edge-joined blank from such tubing.

In forming a hollow rubber article it has heretofore been the practice to cut from sheet-rubber suitable blanks for the article intended to be produced, to place these blanks together, first dusting their adjacent faces with powdered soapstone or similar material to prevent adhesion, and then to edge-join these blanks by handwork after inserting a capsule of vapor-generating material or other medium for the production of gas or vapor during vulcanization, and then to inject air into the article so formed by means of a hollow needle with which the blank is pierced and to close the hole made by the needle with gum or cement. This inflation is necessary to produce a bulb that will withstand the temperature of vulcanization in the vulcanizing-mold, since without such separation the walls will adhere in spite of their pulverulent coating before the heat reaches a temperature sufficient to liberate the gas from the contained capsule or produce vapor. In my improved article no piercing of the walls of the blank is necessary, and the necessity for patching is dispensed with, since the tubing itself contains air, and when a section of it is sheared off by the cutting edges of the dies the contained air is confined therein, and the walls of the blank are thus distended without additional inflation. The air-bags of uncured stock thus formed merely by shearing the tubing are further distended by the immediately following action of the pressing-die, which in uniting the marginal areas tends to confine the air in more limited space, and thus increase the distention of the bag, ball, or bulb.

My improved method of making hollow rubber balls, bulbs, or other articles involves the cutting or shearing of a double-walled blank constituting the green or uncured rubber article from a rubber compound tube, which preferably has been delivered under pressure from the mandrel-dies of an ordinary power tubing-machine. These tube-forming dies assure a practically uniform consistency and molecular character and strength of the pressure-drawn rubber tube, and therefore of the walls of the green blank cut from said tube. The blank-cutting dies are preferably so formed that in practically one operation they cut the double-walled blank from the die-drawn tubing and compress the edges of opposite walls of the blank into most intimate union, thus leaving the blank ready to be at once placed in a mold, to the shaping-walls of which the blank is expanded formatively during the process of vulcanization by outward pressure of gas or vapor generated from a fluid or compound placed within the tubing and preferably prior to cutting the blank from it.

The invention will first be described and then will be particularly defined in claims hereinafter set forth.

Reference is made to the accompanying drawings, forming part of this specification, and in which—

Figure 2:
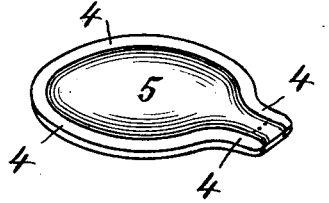
Figure 3:
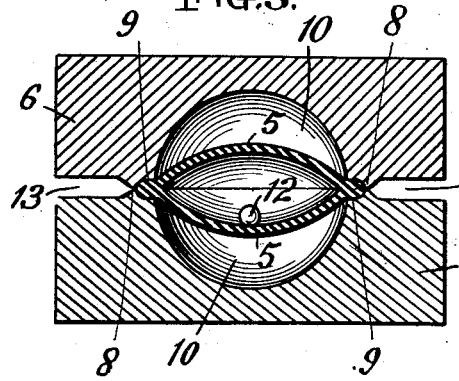
Figure 4:
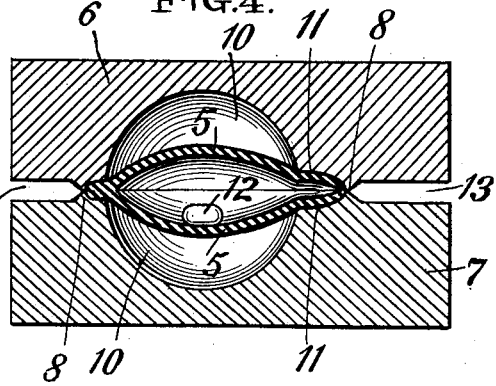
Figure 5:
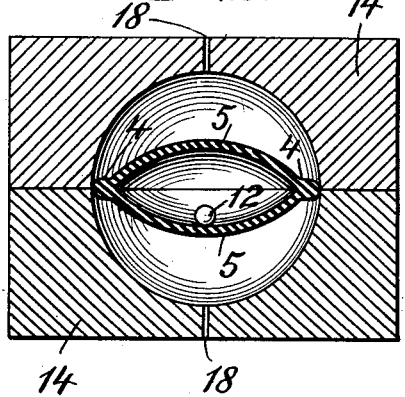
Figure 6:
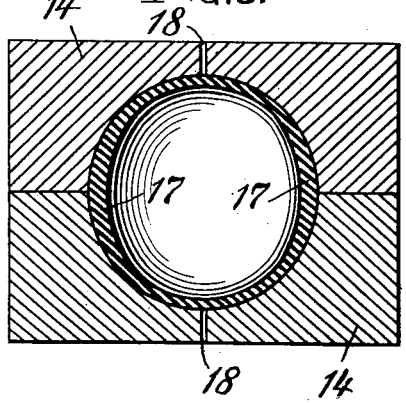
Figure 7:
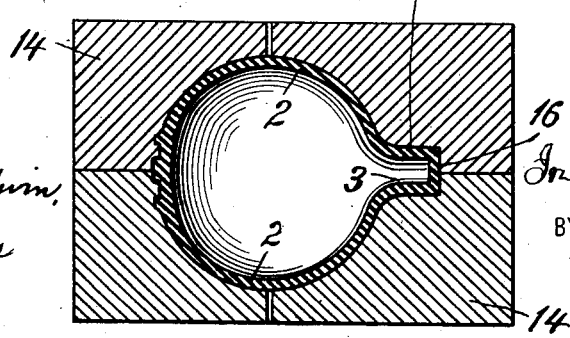

Figure 1 is a perspective view of a partly-flattened piece of green-rubber tubing which has been delivered from the mandrel-dies of a tubing-machine and with the shape of the blank to be cut from it indicated by dotted lines. Fig. 2 is a perspective view of the double-walled edge-seamed blank as it appears after it is cut from the tubing. Figs. 3 and 4 are respectively transverse and longitudinal sectional views showing the preferred dies closed upon the tube as when cutting and edge-seaming the double-walled blank and with the surplus material removed. Fig. 5 is a cross-sectional view showing the green blank in a vulcanizing-mold prior to vulcanization therein. Fig. 6 is a cross-sectional view showing the bulb as expanded formatively to the mold-walls during the process of vulcanization, and Fig. 7 is a longitudinal sectional view of the vulcanized article in the mold.

Ordinary uncured seamless rubber tubing is made from rubber compound or stock which has been properly macerated and mixed and then forced through the mandrel-dies of a tubing-machine. The usual careful preparation of the rubber stock and the forcing of it through the tubing-machine dies results almost necessarily in the production of a seamless rubber compound tube having substantially uniform molecular consistency and strength throughout its entire walls. This structural uniformity is believed to be greater than that obtained in sheet-rubber stock by passing it through calendering-machines. The work of these calendering-machine operators is skilled labor commanding high wages, while the tubing-machine requires only feeding of the macerated stock into a hopper and caring for the die-drawn tubing, which may be done by unskilled and much less expensive labor. By employing rubber tubing as it comes from the tubing-machine instead of using highly-calendered sheet-rubber stock for making balls, bulbs, or other hollow articles I am able to obtain a finished product having walls of great and uniform strength throughout and at a much reduced cost as compared with the usual process of cutting calendered sheet-rubber stock into three or more segments and then hand-joining these segments and inserting independently-formed green-rubber plugs or pieces to form or reinforce the neck or projection of the finished article and then injecting a gas or vapor generating substance to prepare it for the process of vulcanization. By using my invention the green-rubber ball, bulb, or other hollow article is ready for vulcanization immediately after it is cut and pressed in the form of a double-walled blank from a piece of uncured tubing made by any suitable hand or power operated tubing-machine.

In the drawings, Fig. 1 shows a piece of tube 1 cut from a length of green or uncured tubing made by a tubing-machine. This short length of tube 1 is then cut and pressed by a preferred form of dies (shown in Figs. 3 and 4 of the drawings) into a double-walled blank, having, for example, the general form shown in Fig. 2 of the drawings. It will be specially noticed that for quite all the way around the larger body portion of this blank, which later forms the body 2 of the finished article, and also along opposite sides of that projecting portion of the blank which later forms the neck 3 of the bulbous hollow article the edges 4 of the two opposite walls 5 5 of the blank are compressed sufficiently by the die-surfaces to cause them to cohere or to unite intimately or integrally in a close seam. The opposing die-sections 6 7 of preferred form are provided with registering cutting edges 8, usually called the "cut-off," which surround the die-concavities 9, which are so shaped that as the cut-off 8 shears the green blank from the tube 1 the edges 4 of the opposing walls 5 of the blank will be pressed into intimate or integral union by and within the die-concavities 9. The die-sections have suitable chambers 10 large enough to admit the semibulbous body of the blank, and there are continuing outward extensions 11 of the chambers 10 at the blank-neck portion, which concavities 11 do not integrally unite the two blank-walls 5 at the inner neck portion of the blank, while the extremity of the blank-neck is joined by the shearing action of the cut-off 8 sufficiently to close it and to confine within the blank any suitable capsule 12, of ammoniacal fluid or other substance, which will upon the application of the temperature requisite for vulcanization generate necessary gas or vapor under sufficient outward pressure to inflate the blank to the shaping-walls of a suitable mold as the blank is being vulcanized therein. I may easily inject the gas or vapor generating substance into the double-walled edge-seamed blank at the end of its neck portion by a hollow needle instead of placing said substance within the tube prior to cutting the blank therefrom, as I now prefer to do. A marginal opening 13, formed by opposing concavities of the die-sections outside of the cut-off 8, permits clearance or escape of the waste edgings severed from it by the cut-off. I may use dies adapted first to cut out and then edge-compress the double-walled blank in two operations; but I prefer to use suitable dies which cut out the blank and compress its edges in practically one operation, although I may use roller-dies to cut and compress the green-rubber blank in a manner substantially as above described. After the double-walled edge-seamed blank 2 is prepared and charged with the capsule 12, as above described, it is placed in a preferred form of vulcanizing-mold 14 in condition shown in Fig. 5 of the drawings, it being understood that the neck portion of the blank having intimately-seamed opposite edges 4 4 is compressed edgewise by the operator's fingers to more easily admit it into the neck-forming portion 15 of the mold. After this mold containing the blank is placed in any approved vulcanizing apparatus the compound 12 will generate gases or vapors under pressure which will expand the blank to the shaping-walls of the mold, as indicated in Figs. 6 and 7 of the drawings, there being usually formed at the extremity of the bulb neck or nipple 3 an end wall 16 of rubber compound which is trimmed off after removal of the bulb from the mold. Leaving the extremity of the neck-forming portion of the blank 2 unseamed by die-pressure or only slightly joined by the cutting of the blank and so as not to form an integral edging 4 thereat permits said blank-neck portion to be more easily compressed edgewise by the operator, as above described, to facilitate entering it into the mold-cavity 15 and also allows said blank-neck portion to be more readily expanded by the interior gases or vapors to the walls of said mold-cavity 15 during vulcanization. The narrow field of cohesion of the extremity of the blank-neck caused by the shearing action of the die cut-off 8 offers comparatively little resistance to opening into full cylindrical form of the bulb-neck 3 to the mold-walls 15, as above explained. Fig. 6 of the drawings shows that the single surrounding integrally-pressed seam 4 of the green blank 2 is quite obliterated during expansion of the bulb during vulcanization and that where said single intimately-united seam appeared in the blank there results a simple thickening at 17 of the practically-homogeneous wall of the vulcanized bulb. This thickened portion 17, while obliterating the one original seam of the blank, materially increases the strength of the finished bulb. The mold preferably has suitable air-vents 18, facilitating the expansion of the blank to its formative walls.

Hollow rubber articles of any desired size and shape may be produced by my improved process directly from rubber tubing by the aid of proper dies and vulcanizing-molds, and the finished article will have practically uniform consistency and molecular quality throughout its walls and will be stronger even if made from lower-grade stock than articles of like general character produced from parts stamped from highly-calendered sheet-rubber stock and having a number of hand-made joints or seams, so liable to imperfections, and with independently-formed plugs inserted to make or reinforce the neck or other prominent part of the article.

It will be specially noticed that in the preferred manner of carrying out my invention I dispense with calendering-machines and expensive collapsible dies, and I also avoid the expensive and uncertain hand-joining of numerous parts, and I make unnecessary the use of the ordinary hollow needle commonly employed to inject a gas or vapor generating substance into the hollow green articles for insuring their inflation in the vulcanizing-molds, and I also save largely in the work of trimming the hollow articles to a final finish for the market. I am therefore able by my improved process of manufacture to make hollow rubber balls, bulbs, or other articles in great variety at a much reduced cost, while giving them increased strength and better wearing qualities.

I claim as my invention—

1. The herein-described process of making hollow rubber balls, bulbs or other articles, which consists in cutting a double-walled blank from uncured rubber tubing, then pressing the edges of said blank-walls into intimate union, and then vulcanizing the blank, substantially as specified.

2. The herein-described process of making hollow rubber balls, bulbs or other articles, which consists in placing within uncured rubber tubing a gas-generating substance, then cutting from said tubing a double-walled blank, then pressing the edges of the blank-walls into intimate union and confining the gas-generating substance between said walls, and then vulcanizing the blank, substantially as specified.

3. The herein-described process of making hollow rubber balls, bulbs or other articles, which consists in die-drawing tubing from rubber stock, cutting a double-walled blank from said tubing, then pressing the edges of the blank-walls into intimate union, and then vulcanizing the blank, substantially as specified.

4. The herein-described process of making hollow rubber balls, bulbs or other articles, which consists in placing within uncured rubber die-drawn tubing a gas or vapor generating substance, then cutting a double-walled blank from said tubing, then pressing the edges of the blank-walls into intimate union and confining the gas-generating substance between said walls, and then vulcanizing the blank, substantially as specified.

5. The herein-described process of making hollow rubber balls, bulbs or other articles, which consists in die-cutting a double-walled blank from uncured rubber tubing and, simultaneously, in die-pressing the edges of the blank-walls into intimate union, and then vulcanizing the blank, substantially as specified.

6. The herein-described process of making hollow rubber balls, bulbs or other articles, which consists in placing within uncured rubber tubing a gas or vapor generating substance, then die-cutting a double-walled blank from said tubing and, simultaneously, in die-pressing the edges of the blank-walls into intimate union and confining the gas-generating substance between said walls, and then vulcanizing the blank, substantially as specified.

7. The herein-described process of making hollow rubber balls, bulbs or other articles, which consists in die-cutting a double-walled blank from uncured rubber die-drawn tubing and, simultaneously, in die-pressing the edges of the blank-walls into intimate union, and then vulcanizing the blank, substantially as specified.

8. The herein-described process of making hollow rubber balls, bulbs or other articles, which consists in placing within uncured rubber die-drawn tubing a gas or vapor generating substance, then die-cutting a double-walled blank from said tubing and, simultaneously, in die-pressing the edges of the blank-walls into intimate union and confining the gas-generating substance between said walls, and then vulcanizing the blank, substantially as specified.

9. The herein-described process of making hollow rubber balls, bulbs or other articles, which consists in cutting a double-walled blank from uncured rubber tubing, then intimately uniting by pressure the edges of said blank-walls all around except at the extremity of a neck or projection forming portion of the blank, and then vulcanizing the blank, substantially as described.

10. The herein-described process of making hollow rubber balls, bulbs or other articles, which consists in placing within uncured rubber tubing a gas or vapor generating substance, then cutting a double-walled blank from said tubing, then intimately uniting by pressure the edges of said blank-walls all around except at the end of a neck or projection forming portion of the blank and confining the gas-generating substance between said walls, and then vulcanizing the blank, substantially as specified.

IRWIN FLOYD KEPLER.

Witnesses:
WILLIAM G. BLOOM,
HERBERT E. RICHARDSON.